United States Patent
Horikawa

(10) Patent No.: US 9,652,355 B2
(45) Date of Patent: May 16, 2017

(54) BOTTLENECK DETECTION DEVICE, METHOD AND RECORDING MEDIUM STORING PROGRAM

(71) Applicant: NEC Corporation, Minato-ku, Tokyo (JP)

(72) Inventor: Takashi Horikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 14/429,379

(22) PCT Filed: Jul. 8, 2013

(86) PCT No.: PCT/JP2013/068680
§ 371 (c)(1),
(2) Date: Mar. 19, 2015

(87) PCT Pub. No.: WO2014/050254
PCT Pub. Date: Apr. 3, 2014

(65) Prior Publication Data
US 2015/0227446 A1   Aug. 13, 2015

(30) Foreign Application Priority Data
Sep. 25, 2012  (JP) ................................ 2012-211403

(51) Int. Cl.
G06F 11/34    (2006.01)
G06F 11/07    (2006.01)
G06F 11/30    (2006.01)

(52) U.S. Cl.
CPC ...... *G06F 11/3409* (2013.01); *G06F 11/0706* (2013.01); *G06F 11/079* (2013.01); *G06F 11/3024* (2013.01); *G06F 11/3495* (2013.01)

(58) Field of Classification Search
CPC .................... G06F 11/3495; G06F 11/3409
See application file for complete search history.

(56) References Cited

U.S. PATENT DOCUMENTS 8,621,070 B1 * 12/2013 Venneti .................. H04L 43/00
                                                             709/223
9,152,532 B2 * 10/2015 Breternitz ........... G06F 11/3495
(Continued)

FOREIGN PATENT DOCUMENTS

JP    2001-109649 A    4/2001
JP    2001-154889 A    6/2001
(Continued)

OTHER PUBLICATIONS

International Search Report for PCT Application No. PCT/JP2013/068680, mailed on Aug. 13, 2013.
(Continued)

*Primary Examiner* — Yolanda L Wilson

(57) ABSTRACT

In a method which analyzes system behavior using performance indices related to time, a program portion that has become a bottleneck is discovered; however, discovery is not made back to the cause of the same. This bottleneck detection method, when varying a load to measure behavior of a system, performs measurement regarding a plurality of performance indices. Then by analyzing the results of the same by way of analysis unit, program portions that are bottlenecks are identified, and causes of the program portions being bottlenecks are identified.

5 Claims, 7 Drawing Sheets

(56) References Cited

U.S. PATENT DOCUMENTS

| | | | | |
|---|---|---|---|---|
| 9,251,035 B1* | 2/2016 | Vazac | ................ | G06F 11/3495 |
| 2007/0283107 A1* | 12/2007 | Ozaki | .................. | G06F 3/0613 |
| | | | | 711/154 |
| 2008/0301170 A1* | 12/2008 | Laddha | ............... | G06F 11/3419 |
| 2012/0089724 A1* | 4/2012 | Liang | .................. | G06F 11/328 |
| | | | | 709/224 |
| 2012/0233310 A1* | 9/2012 | Agarwala | ........... | H04L 43/0882 |
| | | | | 709/224 |
| 2013/0054792 A1* | 2/2013 | Sharaf | ....................... | G06F 8/20 |
| | | | | 709/224 |
| 2013/0116976 A1* | 5/2013 | Kanemasa | .......... | G06F 11/3452 |
| | | | | 702/186 |
| 2014/0013311 A1* | 1/2014 | Garrett | .................... | G06F 8/443 |
| | | | | 717/128 |

FOREIGN PATENT DOCUMENTS

| | | |
|---|---|---|
| JP | 2003-196125 A | 7/2003 |
| JP | 2006-227999 A | 8/2006 |
| JP | 2007-249844 A | 9/2007 |
| WO | 2007/060721 A1 | 5/2007 |

OTHER PUBLICATIONS

John Levon et al. "O Profile" released Feb. 3, 2002 as version 0.09.URL: http://oprofile.sourceforge.net.

English Translation of write opinion for PCT Application No. PCT/JP2013/068680.

Japanese Office Action for JP Application No. 2014-538237 mailed on Jan. 10, 2017 with English Translation.

* cited by examiner

Fig. 2

RELATED ART

```
CPU: Core 2, speed 1600.06 MHz (estimated)
Counted CPU_CLK_UNHALTED events (Clock cycles when not halted)...
samples    %        app name      symbol name
311072     7.0527   postgres      SB_MatchText
174915     3.9657   postgres      LWLockAcquire
167105     3.7846   postgres      heapTupleSatisfiesMVCC
159066     3.6058   postgres      slot_deform_tuple
139309     3.1584   libc-2.5.so   memcpy
122481     2.7769   postgres      AllocSetAlloc
108879     2.4912   postgres      hash_search_with_hash_value
97091      2.2010   postgres      slot_getsomeattrs
91725      2.0796   postgres      slot_getattr
88125      1.9980   postgres      PinBuffer
77679      1.7612   postgres      SearchCatCache
55460      1.2574   postgres      ExecHashTableInsert
49784      1.1287   postgres      heapgetpage
47523      1.0775   postgres      base_yyparse
42797      0.9703   postgres      heap_page_prune_opt
41046      0.9306   postgres      varstr_cmp
39916      0.9050   postgres      LWLockRelease
38648      0.8762   postgres      bt_checkkeys
37974      0.8610   ip_conntrack  ip_conntrack
36588      0.8295   igb           /igb
35366      0.8018   postgres      heapgetcup_pagemode
.......
```

NUMBER OF EVENT OCCURRENCES ⇦    PERCENTAGE ⇦    PROGRAM NAME ⇦    FUNCTION NAME IN PROGRAM ⇦

Fig. 4

MEASUREMENT CONDITIONS: LOAD AMOUNTS = l;
PERFORMANCE INDICATOR NAME = t;
AND MEASUREMENT TIME PERIOD = T

MEASUREMENT RESULT 1: NUMBER OF TRANSACTIONS = $X_{lt}$

MEASUREMENT RESULT 2:

| FUNCTION NAME | NUMBER OF EVENT OCCURRENCES |
|---|---|
| F1 | $N1_{lt}$ |
| F2 | $N2_{lt}$ |
| .. | .. |
| Fn | $Nn_{lt}$ |

Fig. 5

| LOAD AMOUNT | PERFORMANCE INDICATOR NAME | MEASUREMENT TIME PERIOD | NUMBER OF TRANSACTIONS | FUNCTION NAME | NUMBER OF EVENT OCCURRENCES |
|---|---|---|---|---|---|
| l | t | T | $X_{lt}$ | F1 | $N1_{lt}$ |
| l | t | T | $X_{lt}$ | F2 | $N2_{lt}$ |
| : | : | : | : | : | : |
| l | t | T | $X_{lt}$ | Fn | $Nn_{lt}$ |

MEASUREMENT CONDITIONS — MEASUREMENT RESULTS

Fig. 6

| LOAD AMOUNT | PERFORMANCE INDICATOR NAME | MEASUREMENT TIME PERIOD | NUMBER OF TRANSACTIONS | FUNCTION NAME | NUMBER OF EVENT OCCURRENCES | THROUGHPUT | NUMBER OF EVENT OCCURRENCES PER TR. |
|---|---|---|---|---|---|---|---|
| l | t | T | $X_{lt}$ | F1 | $N1_{lt}$ | $P1_{lt}$ | $E1_{lt} = N1_{lt}/X_{lt}$ |
| : | : | : | : | : | : | : | : |
| l | t | T | $X_{lt}$ | Fn | $Nn_{lt}$ | $Pn_{lt}$ | $En_{lt} = N1_{lt}/X_{lt}$ |
| l | t | T | $X_{lt}$ | F1 | $N1_{lt}$ | $P1_{lt}$ | $E1_{lt} = N1_{lt}/X_{lt}$ |
| : | : | : | : | : | : | : | : |
| l | t | T | $X_{lt}$ | Fn | $Nn_{lt}$ | $Pn_{lt}$ | $En_{lt} = N1_{lt}/X_{lt}$ |
| l | t | T | $X_{lt}$ | F1 | $N1_{lt}$ | $P1_{lt}$ | $E1_{lt} = N1_{lt}/X_{lt}$ |
| : | : | : | : | : | : | : | : |
| l | t | T | $X_{lt}$ | Fn | $Nn_{lt}$ | $Pn_{lt}$ | $En_{lt} = N1_{lt}/X_{lt}$ |
| : | : | : | : | : | : | : | : |

Fig. 7

$$\text{FUNCTION F1} \longrightarrow \left( \frac{E1_{ht}}{E1_{lt}}, \frac{E1_{hi}}{E1_{li}}, \frac{E1_{hc}}{E1_{lc}}, \frac{E1_{hk}}{E1_{lk}} \right)$$

$$\text{FUNCTION F2} \longrightarrow \left( \frac{E2_{ht}}{E2_{lt}}, \frac{E2_{hi}}{E2_{li}}, \frac{E2_{hc}}{E2_{lc}}, \frac{E2_{hk}}{E2_{lk}} \right)$$

...

$$\text{FUNCTION Fn} \longrightarrow \left( \frac{En_{ht}}{En_{lt}}, \frac{En_{hi}}{En_{li}}, \frac{En_{hc}}{En_{lc}}, \frac{En_{hk}}{En_{lk}} \right)$$

BOTTLENECK DETECTION DEVICE, METHOD AND RECORDING MEDIUM STORING PROGRAM

This application is a National Stage Entry of PCT/JP2013/068680 filed on Jul. 8, 2013, which claims priority from Japanese Patent Application 2012-211403 filed on Sep. 25, 2012, the contents of all of which are incorporated herein by reference, in their entirety.

TECHNICAL FIELD

The present invention relates to a technique that analyzes a bottleneck in performance of an information processing apparatus, particularly, relates to a technique for analysis for determining a program part that forms a bottleneck and a cause that results in formation of the bottleneck when the information processing apparatus operates under a high load.

BACKGROUND ART

A behavioral analysis on an information processing apparatus in many cases is performed for improvement in the performance of the information processing apparatus. Such improvement is achieved by finding a part of processing (hereinafter, a bottleneck) that leads to a cause to make the apparatus not operate at a desired performance level, and by removing or suppressing the cause that results in the bottleneck. Here, since the bottleneck can often be found attributable to processing for a certain part of a program, the principle purpose of the behavioral analysis can be used for finding the program part that forms the bottleneck.

An execution time is frequently used as a performance indicator indicating the behavior of the information processing apparatus. This is because the execution time is the performance indicator that most directly reflects the performance of a system. Thus, a number of measurement tools to measure execution times and a number of tools and techniques to analyze the performance have been devised. Patent Literature 1 discloses behavioral analysis performed by a server apparatus, where a measurement tool according to the event-driven scheme (more strictly, the event tracing scheme, which is one form thereof) is used. With reference to a schematic configuration diagram of a bottleneck detection system in FIG. 1, an analysis method disclosed in Patent Literature 1 is described. At the start, with respect to each part (program component) of a measurement target program, measurement functions (application probes), which output events to be traced, are inserted at positions corresponding to starts and ends of execution for each part of the program. Under this condition, the program is executed, time-series data (trace data) of events are sampled, and the trace data are analyzed and subjected to tabulation, so that the execution time is obtained for each part of the measurement target program.

There is a measurement tool employing a scheme to estimate an execution time for each part of the program in accordance with a sampling scheme that differs from the event-driven scheme. Examples of such a tool include OProfile (refer to Non-patent Literature 1), which is a tool that measures the behavior of a program by using a performance counter provided in a central processing unit (CPU). The measurement principle of OProfile is based on the result that, after kinds of hardware events in measurement target hardware and the number of occurrences of the events have been previously specified in the performance counter, an overflow interrupt (non-maskable interrupt (NMI)) occurs at the time when the number of occurrences of the specified kind of event reaches the specified number of occurrences. Specifically, an operation to record a current position of the program is performed every time when the overflow interrupt occurs, and this operation causes to generate a distribution of positions of the programs at which the overflow interrupts have occurred. In OProfile, the distribution obtained by performing such measurement for a long time period is treated as that of positions of the program at which the hardware event occurs, on the basis of a law of large numbers.

FIG. 2 illustrates one example of a measurement result obtained by OProfile. The result indicates "a time required for execution of each part of a program" obtained when a hardware event where a clock driving a CPU advances by one cycle, has been specified as an event to be measured. Each line of this diagram contains tabulated values for an individual part of the program. The respective columns contain, from the left, the number of event occurrences, the percentage thereof (with the number of occurrences of all events set to 100%), the name of a corresponding program, and the name of a corresponding function in the program.

Note that, in the case of x86 processors from Intel, although measurement target hardware and events to be measured that can be set in a performance counter in a CPU differ by kind of processor, the following events can be measured commonly among all kinds of processors: an execution time (an event where the clock advances by one cycle), the number of executed instructions (an event where a CPU completes execution of one instruction), and cache errors in the CPU.

Conventional techniques relating to methods for determining which part of a program forms a bottleneck include Patent Literature 1. Patent Literature 1 discloses a method for determining a part of a program to be a bottleneck, the part of the program showing a remarkable increase in execution time when execution times under a low load condition and execution times under a high load condition are compared for the respective parts of the program.

CITATION LIST

Patent Literature

[PTL 1] Japanese Patent Application Publication No. 2006-227999

Non Patent Literature

[NPL 1] "OProfile", [online], the Internet, (URL: http://oprofile.sourceforge.net)

SUMMARY OF INVENTION

Technical Problem

The above conventional techniques are inconvenient in that these techniques determine the program part that forms the bottleneck but do not determine the cause thereof. These techniques do not determine the cause because they use only the performance indicator in terms of time in bottleneck analysis.

The present invention aims at providing a technique that not only identifies a program part that forms a bottleneck but also identifies a cause to make the program part form the bottleneck.

Solution to Problem

A bottleneck detection device according to the present invention includes:

storage means for storing performance indicator values each obtained by measuring an individual performance indicator with respect to each part of processing executed by an information processing apparatus;

generation means for generating a feature vector based on the stored performance indicator values for each part of the processing; and determination means for, based on the generated feature vectors, determining a part of the processing that forms a bottleneck in performance of the information processing apparatus, and a performance indicator found as a cause that results in the bottleneck.

A bottleneck detection method according to the present invention, implemented in a computer including a controller and a storage unit, includes:

a storage step in which the controller stores, in the storage unit, performance indicator values each obtained by measuring an individual performance indicator with respect to each part of processing executed by an information processing apparatus;

a generation step in which the controller generates a feature vector based on the stored performance indicator values for each part of the processing; and a determination step in which the controller determines, based on the generated feature vectors, a part of the processing that forms a bottleneck in performance of the information processing apparatus, and a performance indicator found as a cause that results in the bottleneck.

A program according to the present invention causes a computer to function as:

storage means for storing performance indicator values each obtained by measuring an individual performance indicator with respect to each part of processing executed by an information processing apparatus;

generation means for generating a feature vector based on the stored performance indicator values for each part of the processing; and determination means for, based on the generated feature vectors, determining a part of the processing that forms a bottleneck in performance of the information processing apparatus, and a performance indicator found as a cause that results in the bottleneck.

Advantageous Effects of Invention

The present invention can provide a technique that not only identifies a program part that forms a bottleneck but also identifies a cause by which the program part forms the bottleneck.

BRIEF DESCRIPTION OF DRAWINGS

FIG. 2 is a diagram illustrating an example output of OProfile, which is one example of a measurement unit.

FIG. 4 is a diagram illustrating one example of information stored in a measurement result storing unit.

FIG. 5 is a diagram illustrating one example of the form of information stored in the measurement result storing unit.

FIG. 6 is a diagram illustrating one example of the content of a measurement result subjected to normalization by a normalization unit.

FIG. 7 is a diagram illustrating one example of feature vectors each generated with respect to an individual function.

DESCRIPTION OF EMBODIMENTS

The following describes an exemplary embodiment of the present invention in detail with reference to the drawings.

Figure 1:
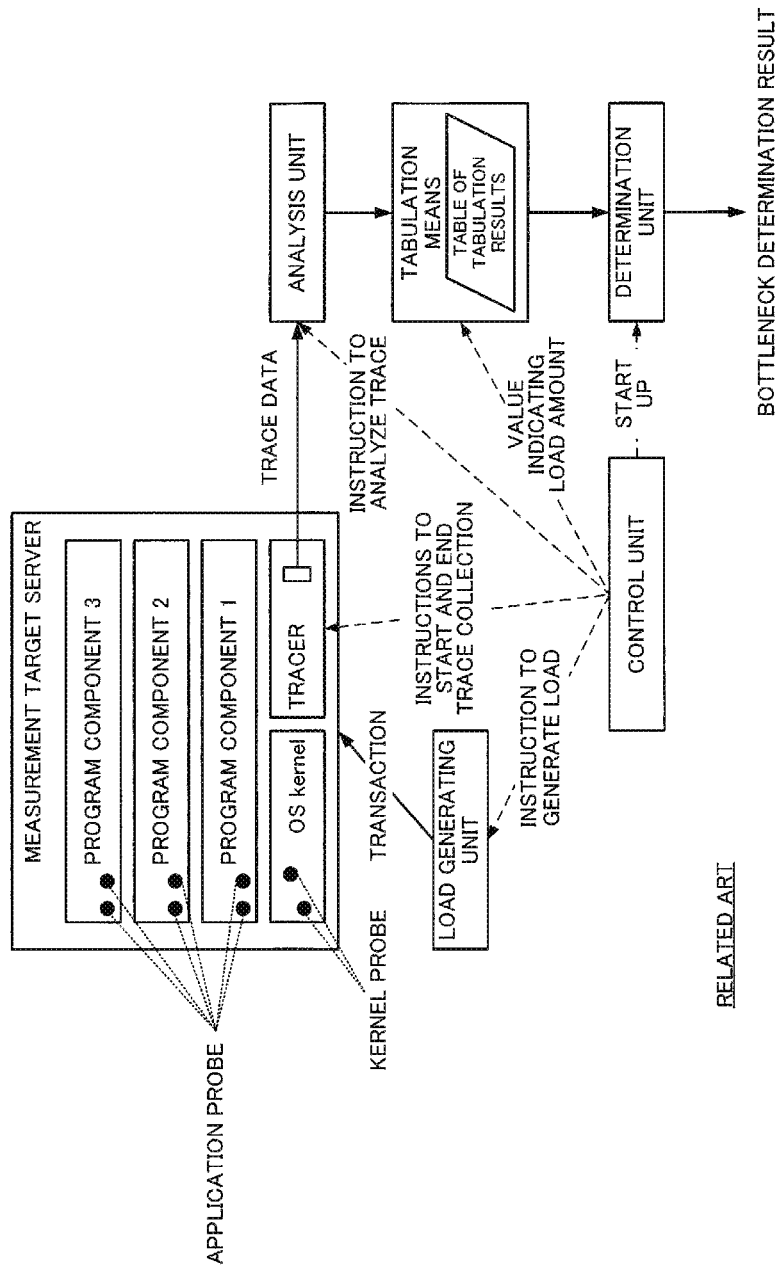
FIG. 1 is a block diagram illustrating a schematic configuration of a bottleneck detection system according to a conventional technique.
Figure 3:
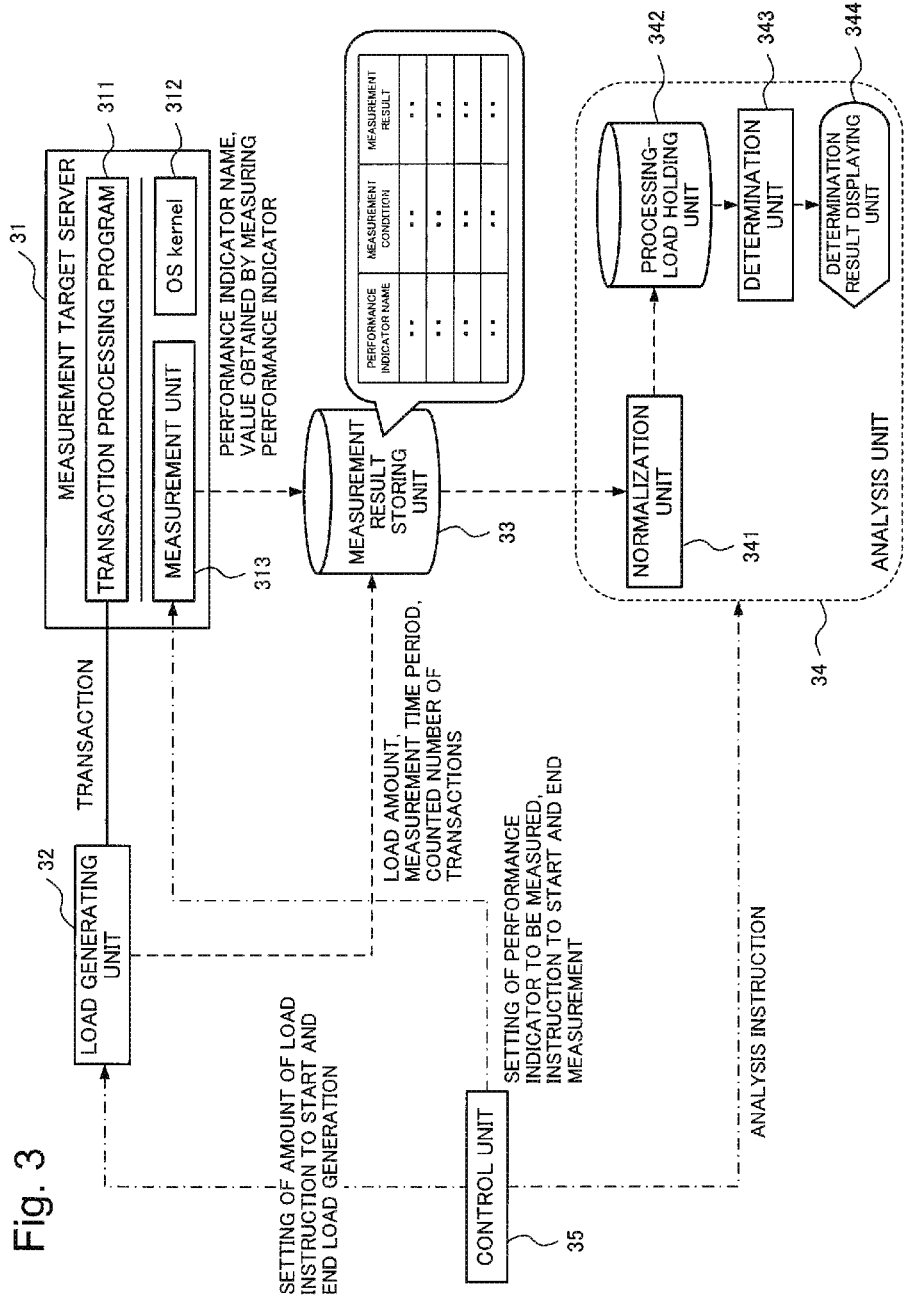
FIG. 3 is a block diagram illustrating a configuration of a system in one exemplary embodiment according to the present invention.

With reference to FIG. 3, a configuration of a system for use in bottleneck detection in the exemplary embodiment is described. This system includes a measurement target server 31 that operates under the control of a program, a load generating unit 32, a measurement result storing unit 33, an analysis unit 34, and a control unit 35. Software that operates on the measurement target server 31 includes a transaction processing program 311, an operating system (OS) kernel 312, and a measurement unit 313. An information processing apparatus such as a server apparatus is used to form the measurement target server 31. The analysis unit 34 includes a normalization unit 341, a processing-load holding unit 342, a determination unit 343, and a determination result displaying unit 344. The outlines of operations of these means are described below.

The load generating unit 32, upon receipt of an instruction from the control unit 35 to start load generation, transmits transactions to the measurement target server 31 in accordance with a load amount as specified by the control unit 35, and measures the number of transactions processed by the measurement target server 31 within a measurement time period. Upon receipt of an instruction from the control unit 35 to end the measurement, the load generating unit 32 stores the specified load amount, the measurement time period (a time period from the start to the end of the measurement) and the measured number of transactions in the measurement result storing unit 33, thereby completing the measurement operation.

In the measurement target server 31, the OS kernel 312 receives the transactions transmitted from the load generating unit 32, which are then forwarded to and processed by the transaction processing program 311. The processing result is returned to a requester of the transactions through the OS kernel 312. The measurement unit 313, upon receipt of an instruction from the control unit 35 to start measurement, measures performance indicators specified by the control unit 35. Upon receipt of an instruction from the control unit 35 to end the measurement, the measurement unit 313 stores the result of the measurement in the measurement result storing unit 33, thereby completing the measurement operation.

The analysis unit 34, according to an instruction from the control unit 35, processes the measurement result stored in the measurement result storing unit 33 to determine a part forming a bottleneck and the cause thereof, and displays the result of the determination through the determination result displaying unit 344.

Note that the system illustrated in FIG. 3 includes a controller such as a CPU, storage units such as a memory and a hard disc drive (HDD), and interfaces such as a communication module in the same manner as a general computer includes them, although they are not illustrated. Each of the above means is implemented, for example, in such a manner that the CPU deploys a program stored in the HDD into the memory, and executes the program. In other words, each of the above means is implemented by collaboration of hardware and software.

The following describes the above operations in detail with reference to specific examples.

The measurement unit 313 measures performance by use of OProfile. Although performance indicators that are measureable by use of OProfile are different by processor, this exemplary embodiment assumes that the measurable performance indicators include an execution time, the number of executed instructions, the number of cache errors, and the number of times of a bus lock operation. The execution time is a time period that execution of a program has required. The number of executed instructions is the number of instructions that has been required for execution of the program. The number of cache errors is the number of cache errors in connection with execution of the program. The number of times of a bus lock operation is the number of times the bus lock operation which is executed in connection with an exclusive control operation.

The results of measurement of these performance indicators are tabulated, according to the measurement principle explained in connection with a conventional technique, with respect to each function (part of processing) in the program. In OProfile, one performance indicator is measured at one time of measurement. Therefore, in order to obtain measurement results of a plurality of performance indicators, measurement is performed a plurality of times such that, while the same load amount is assigned to all of the performance indicators, each of the performance indicators is measured at one time.

In the exemplary embodiment, variations of measurement that is performed under the control of the control unit 35 are the following two: measurement with a load amount set to a low load (hereinafter, denoted as "l"); and measurement with a load amount set to a high load (hereinafter, denoted as "h"). Additionally, the number of performance indicators that are measured by the measurement unit 313 are the following four: an execution time (hereinafter, denoted as "t"); the number of executed instructions (hereinafter, denoted as "i"); the number of cache errors (hereinafter, denoted as "c"); and the number of times of the bus lock operation (hereinafter, denoted as "k"). In other words, the number of times measurement is performed is eight, which is the number of combinations of the load amounts and the performance indicators. To make the explanation simpler, the measurement is performed for the same time period (hereinafter, denoted as "T").

FIG. 4 shows, as an example, results obtained by performing performance measurement under the following conditions: the load amount is l; the performance indicator name is t; and the measurement time period is T. Here, the measurement results include: the number of transactions executed by the measurement target server 31 within the measurement time period (T) measured by the load generating means (hereinafter, denoted as "$X_{lt}$"); and the number of event occurrences measured with respect to each function (hereinafter, denoted as F1 to Fn) by OProfile (denoted as $N1_{lt}$ to $Nn_{lt}$). Here, "1" to "n" appended to F and N are subscripts indicating the reference numbers of the functions, and "lt" appended to N is a subscript indicating a measurement condition.

The measurement results in this exemplary embodiment include a table (MEASUREMENT RESULT 2 in FIG. 4) of the names of functions and the number of event occurrences, which are measurement results obtained by OProfile. The table shown in FIG. 5 is a table that, in each line, contains a load amount, a performance indicator name, and a measurement time period, which are the execution conditions, and additionally contains a field of a column for the number of executed transactions, which is a result of counting by the load generating unit 32. This table is stored in the measurement result storing unit 33.

The important point here is that this exemplary embodiment makes it possible to retrieve, with respect to the execution condition of having the same load amount, measurement results of a plurality of performance indicators by adding the names of the performance indicators in the column in the table. A method for thus storing measurement results so as to retrieve measurement results of a plurality of performance indicators is not limited to the method for storing a table such as the one shown in FIG. 5. Any method for storing performance measurement results is included in the present invention as long as the method is characterized in that the method makes it possible to retrieve, with respect to the execution condition of having the same load amount, measurement results of a plurality of performance indicators.

Upon completion of eight times of the measurement performed under the control of the control unit 35, the control unit 35 starts up the analysis unit 34. When the analysis unit 34 is started up, the normalization unit 341 is caused to obtain the number of event occurrences per transaction (=the number of event occurrences/the number of executed transactions) and a throughput (=the number of executed transactions/the measurement time period) with respect to each line of the table stored in the measurement result storing unit 33 and add columns for these results, in the first place. FIG. 6 illustrates one example of a table generated by this processing.

Subsequently, the normalization unit 341 generates feature vectors shown in FIG. 7 with respect to all of the functions (parts of processing) that appear in the table in FIG. 6. Here, each component of each feature vector is based on the proportion of "the number of event occurrences per transaction under a high load" to "the number of event occurrences per transaction under a low load" with respect to an individual performance indicator. In this exemplary embodiment, the proportion is taken as each component of the feature vector. However, another exemplary embodiment that uses the difference instead of the proportion is a technical matter that is easily conceivable from the present invention, and therefore, is included in the present invention. That is, the feature vector has components calculated with respect to individual performance indicators, and each of the components is based on a relation between a performance indicator value obtained by measurement under a low load and a performance indicator value obtained by measurement under a high load.

The feature vectors corresponding to the respective functions are input to the determination unit 343. The determination unit 343 determines a function (a part of processing) that forms a bottleneck, and a cause that results in the bottleneck. Specifically, the determination unit 343 extracts, as a bottleneck part, a function that is placed at the top as a result of sorting the functions in descending order of proportion of execution times, in the first place. Subsequently, the determination unit 343 compares the proportions used as the respective components (i.e., the number of executed instructions, the number of cache errors, and the bus lock operation number of times) of the feature vector of the function that has been extracted as the bottleneck part, thereby determining the component that has the largest value to be the cause of the bottleneck.

Specifically, in the case (1) when a component with the largest value is the proportion of the numbers of executed instructions, an increase in the number of instructions required to be executed (=the volume of processing) due to an increase in load is determined to be a cause of the bottleneck. In the case (2) when a component with the largest value is the proportion of the numbers of cache errors, an increase in average access time due to an increase in the number of cash errors due to an increase in load is determined to be a cause of the bottleneck. In the case (3) when a component with the largest value is the proportion of the number of times of a bus lock operation, an increase in the number of times an exclusive control operation is executed due to an increase in load is determined to be a cause of the bottleneck. In other words, a performance indicator that is the cause of the bottleneck is determined on the basis of the components of a feature vector, which are calculated with respect to individual performance indicators.

When being considered in association with operations of software, these determination results can be interpreted as suggesting that the function contains: in the case (1), a loop at which the number of times of execution depends on a load amount, for example; in the case (2), data, such as sequence data, from which the amount of accessed data depends on a load amount; or, in the case (3), exclusive control in which the severity of competition increases with an increase in load amount. In other words, this means that this determination operation has resulted in determination of a bottleneck part (function) and a cause of the bottleneck.

Note that, in a measurement tool (such as OProfile) that estimates the number of event occurrences within each function by the sampling scheme, a larger error is involved when the number of event occurrences is smaller. Consequently, an error involved in the proportion of the numbers of event occurrences under the high load and under the low load is likely to be larger. A performance indicator with a small number of event occurrences, for example, the performance indicator that has a percentage smaller than a predetermined value in the results shown in FIG. 2 scarcely affects processing performance. Therefore, it is possible to configure the determination operation to include a filtering operation such that, when such a value (the number of event occurrences or an event occurrence percentage) of a component is small, the component is left out of consideration in the determination. The determination unit 343 that performs such a filtering operation is a technical matter easily conceivable from the present invention, and is included in the present invention.

The determination results (that is, a part that forms the bottleneck and the cause of the bottleneck) obtained by the determination unit 343 are displayed in a form understandable to people through the determination result displaying unit 344. Note that outputting of the determination results is not limited to having it displayed. The determination results may be output to an external apparatus in a form recognizable to computers.

This application claims priority from Japanese Patent Application No. 2012-211403, filed on Sep. 25, 2012, the entire contents of which are incorporated herein by reference.

The present invention is described above with reference to the exemplary embodiment. However, the present invention is not limited to the above exemplary embodiment. Various modifications understandable to the skilled person can be made to configurations and details of the present invention without departing from the scope of the present invention.

Part or the entirety of the above-described exemplary embodiment can be described as in the following notes. However, the following descriptions in the notes are not intended to limit the present invention.

(Supplementary Note 1)

A bottleneck detection device including:

storage unit for storing performance indicator values each obtained by measuring an individual performance indicator with respect to each part of processing executed by an information processing apparatus;

generation unit for generating a feature vector based on the stored performance indicator values for each part of the processing; and determination unit for, based on the generated feature vectors, determining a part of the processing that forms a bottleneck in performance of the information processing apparatus, and a performance indicator found as a cause that results in the bottleneck.

(Supplementary Note 2)

The bottleneck detection device according to claim 1, wherein the stored performance indicator values include performance indicator values obtained by the measurement when a low load is assigned to the information processing apparatus and when a high load is assigned thereto, and the generated feature vectors are further based on a relation between the performance indicator value obtained when the low load is assigned and the performance indicator value obtained when the high load is assigned.

(Supplementary Note 3)

The bottleneck detection device according to claim 1 or 2, wherein the generated feature vectors have components calculated with respect to the respective performance indicators, and the performance indicator found as a cause that results in the bottleneck is determined based on the components calculated with respect to the respective performance indicators.

(Supplementary Note 4)

The bottleneck detection device according to any one of claims 1 to 3, further comprising output unit for outputting the part of the processing that has been determined as to be the bottleneck and the performance indicator found as a cause that results in the bottleneck.

(Supplementary Note 5)

A bottleneck detection method that is implemented in a computer including a controller and a storage unit, the bottleneck detection method including:

a storage step in which the controller stores, in the storage unit, performance indicator values each obtained by measuring an individual performance indicator with respect to each part of processing executed by an information processing apparatus;

a generation step in which the controller generates a feature vector based on the stored performance indicator values for each part of the processing; and a determination step in which the controller determines, based on the generated feature vectors, a part of the processing that forms a bottleneck in performance of the information processing apparatus, and a performance indicator found as a cause that results in the bottleneck.

(Supplementary Note 6)

A program that causes a computer to function as:

storage unit for storing performance indicator values each obtained by measuring an individual performance indicator with respect to each part of processing executed by an information processing apparatus;

generation unit for generating a feature vector based on the stored performance indicator values for each part of the processing; and determination unit for, based on the generated feature vectors, determining a part of the processing that forms a bottleneck in performance of the information processing apparatus, and a performance indicator found as a cause that results in the bottleneck.

INDUSTRIAL APPLICABILITY

Examples of utilization of the present invention include application to, for example, a program for efficiently finding out a performance problem that occurs in a load test in information system construction, particularly, a program for efficiently finding out a location that has a cause of a performance bottleneck and the cause when the performance bottleneck is attributed to parallel processing of a plurality of transactions.

REFERENCE SIGNS LIST 31 measurement target server
32 load generating unit
33 measurement result storing unit
34 analysis unit
35 control unit

What is claimed is:

1. A bottleneck detection device comprising:
   a storage unit configured to store performance indicator values, each obtained by measuring an individual performance indicator with respect to each part of processing executed by an information processing apparatus;
   a generation unit configured to generate a feature vector based on the stored performance indicator values for each part of the processing; and
   a determination unit configured to, based on the generated feature vectors, determine a part of the processing that forms a bottleneck in performance of the information processing apparatus, and determine a performance indicator found as a cause that results in the bottleneck,
   wherein the stored performance indicator values include performance indicator values obtained by the measurement when a low load is assigned to the information processing apparatus and when a high load is assigned thereto, and
   wherein the generated feature vectors are further based on a relation between the performance indicator value obtained when the low load is assigned and the performance indicator value obtained when the high load is assigned.

2. The bottleneck detection device according to claim 1, wherein
   the generated feature vectors have components calculated with respect to the respective performance indicators, and
   the performance indicator found as a cause that results in the bottleneck is determined based on the components calculated with respect to the respective performance indicators.

3. The bottleneck detection device according to claim 1, further comprising output means for outputting the part of the processing that has been determined as to be the bottleneck and the performance indicator found as a cause that results in the bottleneck.

4. A bottleneck detection method that is implemented in a computer including a controller and a storage unit, the bottleneck detection method comprising:
   a storage step in which the controller stores, in the storage unit, performance indicator values, each obtained by measuring an individual performance indicator with respect to each part of processing executed by an information processing apparatus;
   a generation step in which the controller generates a feature vector based on the stored performance indicator values for each part of the processing; and
   a determination step in which the controller determines, based on the generated feature vectors, a part of the processing that forms a bottleneck in performance of the information processing apparatus, and a performance indicator found as a cause that results in the bottleneck,
   wherein the stored performance indicator values include performance indicator values obtained by the measurement when a low load is assigned to the information processing apparatus and when a high load is assigned thereto, and
   wherein the generated feature vectors are further based on a relation between the performance indicator value obtained when the low load is assigned and the performance indicator value obtained when the high load is assigned.

5. A non-transitory computer readable medium storing a computer program causing a computer to function as:
   storage means for storing performance indicator values each obtained by measuring an individual performance indicator with respect to each part of processing executed by an information processing apparatus;
   generation means for generating a feature vector based on the stored performance indicator values for each part of the processing; and
   determination means for, based on the generated feature vectors, determining a part of the processing that forms a bottleneck in performance of the information processing apparatus, and a performance indicator found as a cause that results in the bottleneck,
   wherein the stored performance indicator values include performance indicator values obtained by the measurement when a low load is assigned to the information processing apparatus and when a high load is assigned thereto, and
   wherein the generated feature vectors are further based on a relation between the performance indicator value obtained when the low load is assigned and the performance indicator value obtained when the high load is assigned.

* * * * *